APPARATUS FOR REGISTERING TELEPHONE CALLS

Filed Nov. 20, 1963 5 Sheets-Sheet 1

APPARATUS FOR REGISTERING TELEPHONE CALLS

Filed Nov. 20, 1963

United States Patent Office 3,288,935

Patented Nov. 29, 1966

3,288,935

APPARATUS FOR REGISTERING TELEPHONE CALLS

Neal Hepner, 4246 Sandy Lane, Birmingham, Mich.

Filed Nov. 20, 1963, Ser. No. 324,917
5 Claims. (Cl. 179—11)

This invention relates generally to telephone apparatus installed on a subscriber's premises. More particularly, the invention relates to apparatus serving to register the incidence of incoming telephone calls.

It often happens that a telephone subscriber or user may realize benefit in having knowledge that a particular telephone had been rung in response to an incoming call during a period of time the telephone may have been left unattended. It is a principal object of this invention to provide means which will serve to register the incidence of an incoming telephone call which may not have been answered.

When a telephone is left unattended, even for a relatively short period of time, there exists the possibility of a multiplicity of calls being placed to that telephone. It may occassionally be desirable for the subscriber or user to know the extent of effort which had been made to place calls through to his telephone while it may have been left unattended. It is accordingly an additional object of this invention to provide apparatus which will automatically register a quantitative accounting of unanswered incoming telephone calls.

A feature of this invention resides in utilization of the subscriber's signal ringer system to control the operating means serving to effect the storing of data in the register.

The mechanical connection between the handset (or receiver) and the cradle switch of a telephone set is generally described as a "switchhook." A handset positioned in its cradle is said to be "on hook," while a handset out of its cradle is said to be "off hook." An important feature of this invention is the utilization of the switchhook mechanism of automatically removing all recorded information stored in the register. The operation of clearing the register of information stored therein is automatically accomplished though actuation of the switchhook during normal use of the telephone.

Further objects of the invention are to provide apparatus for registering the incidence of incoming telephone calls which is durable and dependable in operation, which can be manufactured at low cost, and which can be adapted to function in conjunction with a wide variety of telephone equipment.

Other objects, features and advantages of the invention will appear in the following description and appended claims, read in connection with the accompanying drawings in which is illustrated an exemplary form of apparatus for registering the incidence of incoming telephone calls embodying the present invention, this being indicative of but one of the various ways in which the principle of the invention may be employed.

Figure 1:
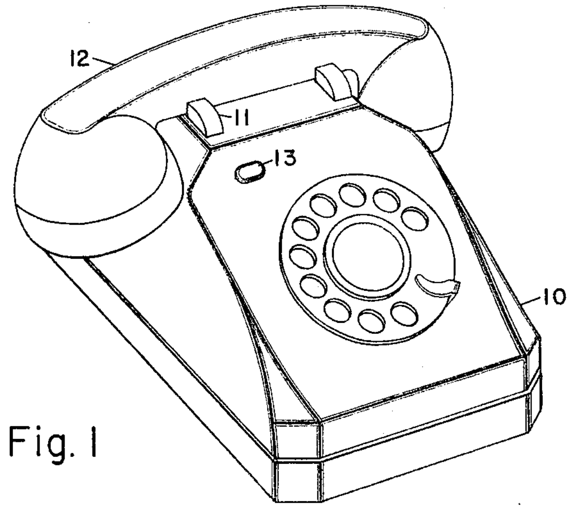
FIGURE 1 is a perspective view of a telephone set having the novel apparatus of the present invention installed therein.

Before explaining the present invention in detail, it is to be understood that the invention is not limited in its application to the details of construction and arrangement of parts illustrated in the accompanying drawings, since the invention is capable of other embodiments and of being practiced or carried out in other ways. Also, it is to be understood that the phraseology or terminology employed herein is for the purpose of description and not of limitation.

With reference to the drawings, a preferred arrangement of an apparatus for registering telephone calls is shown installed in the telephone set illustrated in FIGURES 1, 4, 5 and 6. A casing 10 is provided with integral lugs 11 forming a cradle for the handset 12. Casing 10 has a transparent window 13 provided for the purpose of enabling viewing of the numerals on a register wheel 14 as those numerals are brought into registration with the transparent window.

Figure 4:
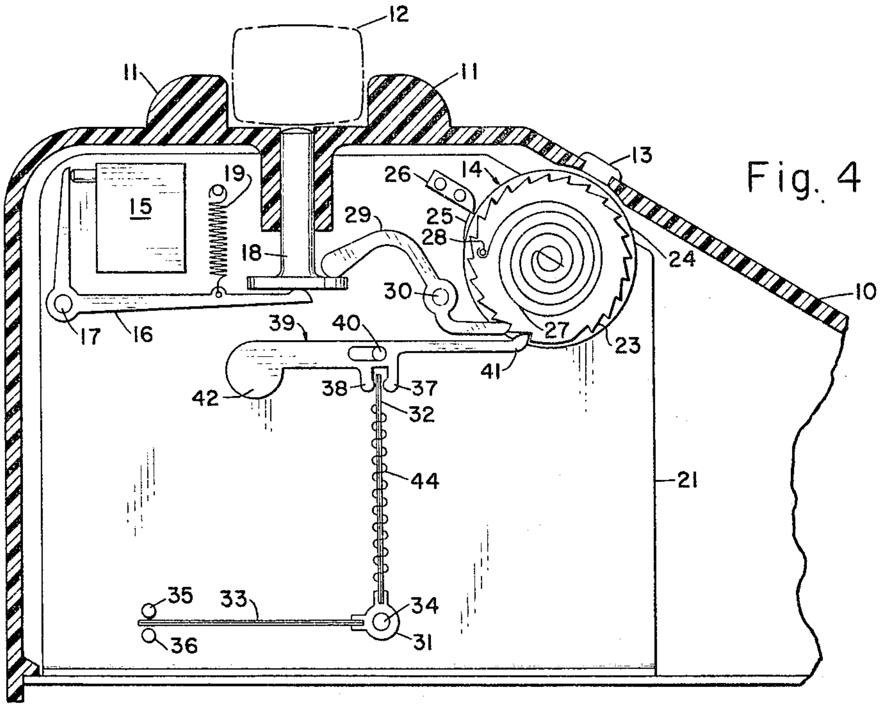
FIGURE 4 is a partial cross-sectional view of the telephone set of FIGURE 1 illustrating the novel appartus.
Figure 5:
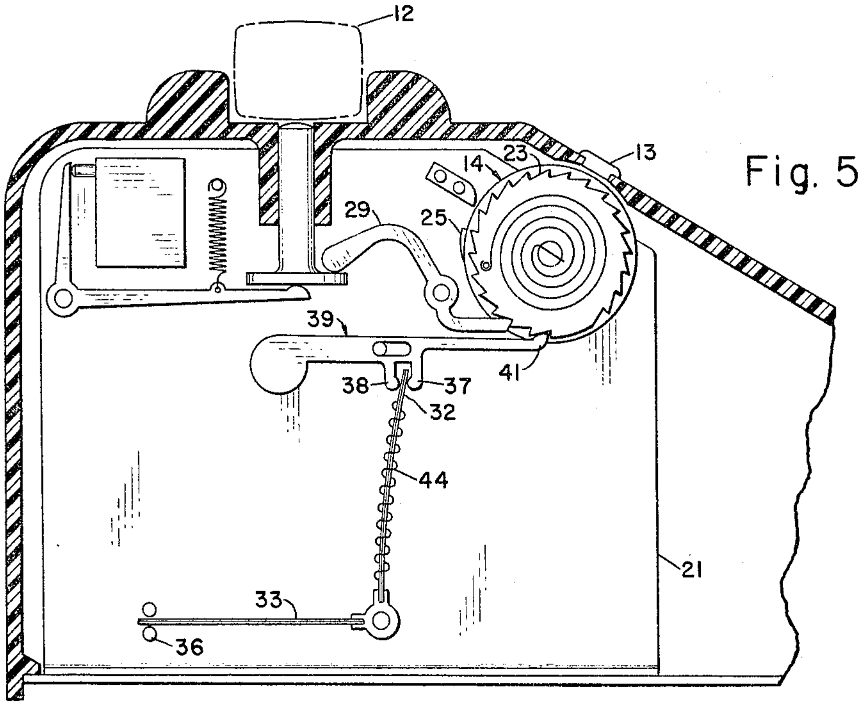
FIGURES 5 and 6 are views similar to that of FIGURE 4 but illustrating different phases of operation.
Figure 6:
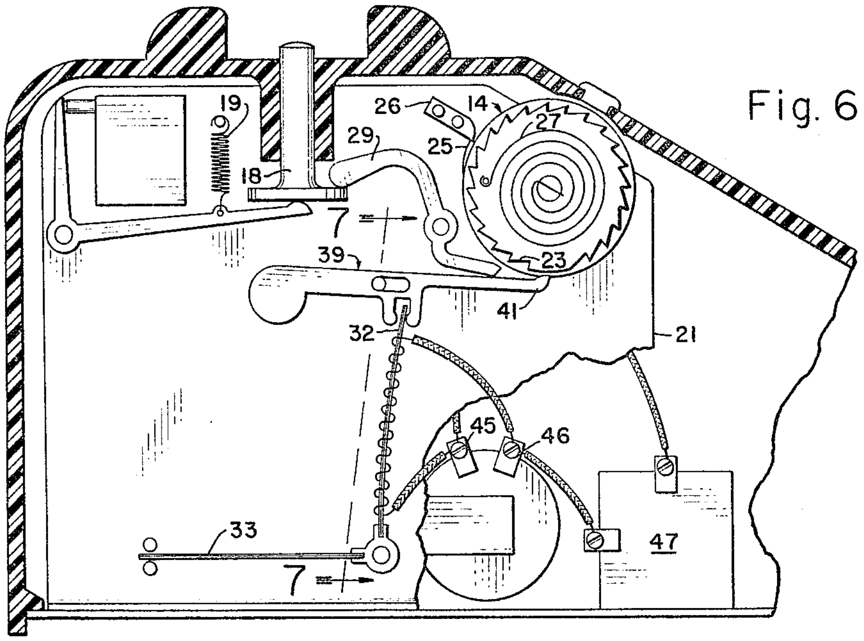

The views of FIGURES 4, 5 and 6 show a cradle switch 15 mounted in fixed position within the telephone casing. A cradle switch is employed in telephone sets in order that the signal ringer apparatus alone may be operatively connected with the line while the handset is in the cradle, and in order that the signal ringer apparatus may be cut out of the circuit when the handset is removed from the cradle. A switchhook bellcrank lever 16 is mounted for pivoting on a fixed post 17. One arm of bellcrank lever 16 is disposed in alignment with the plunger of cradle switch 15, and the other arm of bellcrank lever 16 is urged upward against the under side of a switchhook plunger 18 by the action of an extension spring 19. Removal of the handset from the cradle will cause the switchhook plunger 18 to be moved to the uppermost position of travel as shown in FIGURE 6, and replacement of the handset will cause the switchhook plunger 18 to be moved to the lowermost position of travel as shown in FIGURES 4 and 5. The foregoing movements of switchhook plunger 18 bring about the desired telephone circuit changes in the manner already well known.

Figure 2:
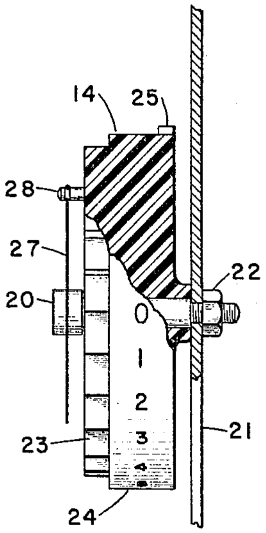
FIGURE 2 is a greatly enlarged view, shown partially in section, illustrating the register wheel contained within the telephone set of FIGURE 1.

As shown in the illustration of FIGURE 2, register wheel 14 is mounted for rotation on a post 20 which is securely held in fixed position upon a stationary vertical mounting plate 21 by means of a nut 22. Register wheel 14 has a plurality of ratchet teeth 23 formed as an integral part thereof. The ratchet teeth 23 are of equal size and are equally spaced on an arc extending approximately 330 degrees around the register wheel. The cylindrical surface 24 of register wheel 14 has numbers inscribed thereupon, each of the numbers being inscribed in a location which is in fixed relationship to the particular ratchet tooth 23 which must correspond therewith. A zero-position stop lug 25 is formed as an integral part of register wheel 14. Zero-position stop lug 25 extends outward from the cylindrical surface 24 and is in abutting relationship with the lower plane surface of a stop plate 26. Stop plate 26 is fixed to vertical mounting plate 21 with rivets, as illustrated in FIGURE 4. The head end of post 20 is provided with a slot which serves as an anchor for the inner end of a spiral torsion spring 27. The outer end of spiral torsion spring 27 is attached to a grooved stud 28 extending outward from the end face of register wheel 14. Spiral torsion spring 27 imparts a light but positive turning effort to register wheel 14 at all times, the turning effort being applied in the clockwise direction in the illustrations of FIGURES 4, 5 and 6. When cooperating parts are moved out of engagement with ratchet teeth 23, as illustrated in FIGURE 6, the spiral torsion spring 27 will cause register wheel 14 to rotate until the zero-position stop lug 25 abuts against stop plate 26; in this position of the register wheel the numeral "0" inscribed on cylindrical surface 24 is in registration with transparent window 13.

As shown in the illustrations of FIGURES 4, 5 and 6, a pawl 29 is mounted for pivoting on a post 30 which is fixed to vertical mounting plate 21. One arm of pawl 29 extends out over the uppermost surface of the enlarged end of switchhook plunger 18, and the other arm extends in the opposite direction for engagement with ratchet teeth 23. The weight of pawl 29 is distributed so that a counterclockwise turning moment acts thereupon at all times, thus urging the lower arm of pawl 29 against the ratchet teeth 23 whenever siwtchhook plunger 18 is in its lowermost position of travel. Turning effort applied to register wheel 14 in the counterclockwise direction, if sufficient to overcome the light opposing forces, will effect rotation of the register wheel in that direction. Whenever handset 12 is in the cradle, pawl 29 operates to arrest clockwise rotation of register wheel 14 at fixed increments defined by the position of ratchet teeth 23 relative to the surfaces of pawl 29 coacting therewith. When handset 12 is removed from the cradle, pawl 29 is rocked in a clockwise direction by the upward movement of switchhook plunger 18, thus effecting disengagement of the lower arm of pawl 29 with register wheel 14.

Figure 8:
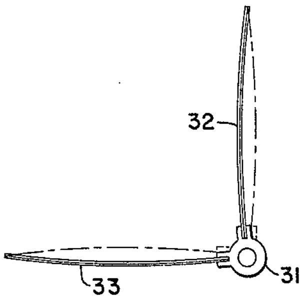
FIGURE 8 is a view of the bimetal operator illustrating the configuration thereof at elevated and lowered ambient temperatures.

The bimetal operating means, illustrated separately in FIGURE 8 of the drawings, is a thermally responsive device having a hub element 31, a bimetal actuating element 32 firmly secured to hub element 31 and extending upwardly therefrom, and a bimetal compensating element 33 firmly secured to hub element 31 and extending horizontally outward therefrom. A bimetal actuating element may be described as consisting of two distinct metals having different coefficients of thermal expansion bound together in such a way that the internal strains caused by temperature changes effect deflection or distortion of the element. Bimetal compensating element 33, which is similar in construction and configuration to bimetal actuating element 32, serves to nullify the effects caused by variations in ambient temperature. High ambient temperatures will cause the bimetal operating means to assume the configuration shown in the solid-line illustration of FIGURE 8; low ambient temperatures will cause the bimetal operating means to assume the configuration shown in the broken-line figure superimposed thereupon. It will be apparent from examination of the illustrations of FIGURE 8 that the outermost end of bimetal compensating element 33 remains in relatively fixed position with respect to the uppermost end of bimetal actuating element 32 regardless of changes in ambient temperature. With the outermost end of bimetal compensating element 33 held in fixed position, increasing ambient temperatures will effect a slight counterclockwise rotation of hub element 31 without altering the position of the uppermost end of bimetal actuating element 32; decreasing ambient temperatures will effect a slight clockwise rotation of hub element 31 without altering the position of the uppermost end of bimetal actuating element 32. With the outermost end of bimetal compensating element 33 held in fixed position, an increase in the temperature of bimetal actuating element 32 above the temperature of bimetal compensating element 33 will cause the uppermost end of bimetal actuating element 32 to move to the right in a clockwise direction about hub element 31; as the above described differential in temperatures becomes reduced, the uppermost end of bimetal actuating element 32 moves to the left in a counterclockwise direction about hub element 31.

Figure 7:
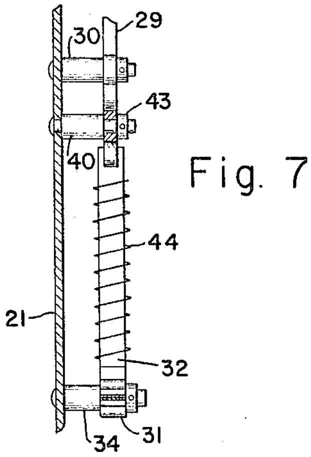
FIGURE 7 is a fragmentary section view taken along the line 7—7 of FIGURE 6.

Hub element 31 has an axial hole extending therethrough and is thereby mounted for pivoting on a post 34 which is fixed to vertical mounting plate 21, as illustrated in FIGURES 4 and 7. An upper limit pin 35 is fixed at one end to vertical mounting plate 21, from which it extends outward for the purpose of blocking upward movement of the outermost end of bimetal compensating element 33. A lower limit pin 36 is similarly fixed to vertical mounting plate 21 for the purpose of blocking downward movement of the outermost end of bimetal compensating element 33.

The uppermost end of bimetal actuating element 32 extends between a driving ear 37 and a return ear 38, which are integral parts of an index slide 39. Index slide 39 has an elongated slot in the center portion thereof and is thereby mounted for pivoting and sliding on a post 40 which is fixed to vertical mounting plate 21. One end of index slide 39 has a finger 41 which is engageable with ratchet teeth 23, and the other end has an enlarged portion 42 which serves to impose a turning moment in the counterclockwise direction upon said index slide by virtue of the weight distribution thereof about post 40. Index slide 39 is movable in a plane only, it being restrained against lateral movement by a shoulder on post 40 on one side and a retaining collar 43 fixed onto post 40 on the other side, as illustrated in the view of FIGURE 7. Similarly, hub element 31 and pawl 29 are movable in a plane only, each being restrained against lateral movement by a shoulder on the mounting post on one side and a retaining collar fixed onto the post on the other side.

Bimetal actuating element 32 is provided with an electrical heater element 44 made of a suitable resistive material such as Nichrome wire. The windings of electrical heater element 44 are electrically insulated from the bimetal actuating element 32 as for example by means of a thin sheet of mica (not shown). Electrical heater element 44 is connected in parallel with the usual telephone bell so that it receives electrical energy simultaneously with the ringing of the bell.

Figure 3:
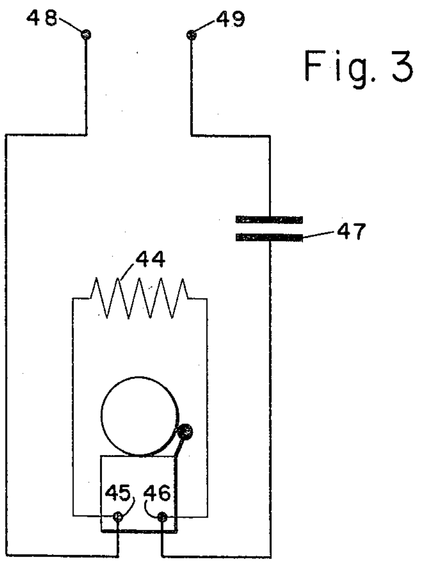
FIGURE 3 is a diagrammatic view showing the manner of connecting the novel apparatus to the signal ringer circuit within the telephone set of FIGURE 1.

A telephone bell is shown symbolically in the circuit diagram of FIGURE 3 with the terminals of heater element 44 connected to bell terminals 45 and 46. Ringing current commonly utilized in telephone circuits is alternating current of approximately 20 cycles per second, which causes, the armature of the bell to vibrate at the same frequency and thus produce the ringing signal. A condenser 47 is ordinarily included in the ringer circuit to serve the purpose of allowing only alternating current to pass through the bell and to prevent direct current from flowing. Terminals 48 and 49 of the ringer circuit are connected with the subscriber's telephone line installation when the handset is in the cradle, the connection generally being completed through the cradle switch.

Operation of the apparatus can best be understood by referring to FIGURES 4, 5 and 6, wherein different phases of operation are illustrated. In FIGURE 4, handset 12 is in the cradle; register wheel 14 is in the "cleared" position with zero-position stop lug 25 in abutting relationship with stop plate 26 and the numeral "0" visible through transparent window 13; the lower arm of pawl 29 is engaged with the second one of ratchet teeth 23; index slide 39 is in the restored position with finger 41 thereof engaged with the first one of ratchet teeth 23; bimetal actuating element 32 is in contact with return ear 38 of the index slide and is applying a slight force thereto; bimetal compensating element 33 is in contact with upper limit pin 35 and is exerting a slight force thereagainst; the telephone bell is not ringing; heater element 44 is not energized, and ambient temperatures are normal. The changes which take place in the foregoing when the telephone bell is being rung in response to an incoming call are illustrated in the view of FIGURE 5. When an alternating current begins to flow in the signal ringer circuit, a portion of that current is directed through heater element 44. Current flowing through heater element 44 causes the temperature of bimetal actuating element 32 to rise, thus effecting deflection of the uppermost end of bimetal actuating element 32 toward driving ear 37 of index slide 39. As the temperature of bimetal actuating element 32 increases, the uppermost end thereof exerts sufficient force upon driving ear 37 to move index slide 39 toward the right, thus indexing register wheel 14 in a counterclockwise direction. Whenever bimetal actuating element 32 acts against driving ear 37, bimetal compensating element 33 reacts with equal force against lower limit pin 36. Index slide 39 can be moved to the right only so far as the elongated slot therein will permit. As index slide 39 approaches the limit of rightward travel, the lower arm of pawl 29 engages the third one of ratchet teeth 23; also, the numeral "1" appears in registration for viewing through transparent window 13. As the series of rings is permitted to continue, as would often happen when the telephone is not answered, no further change occurs in the relationship of the various components. When the series of rings terminates, bimetal actuating element 32 begins to cool and the uppermost end thereof bears against return ear 38, causing index slide 39 to be moved leftward. As the temperature of bimetal actuating element 32 approaches that of bimetal compensating element 33, index slide 39 reaches the extreme leftward position of travel as established by the elongated slot therein. As index slide 39 is approaching the extreme leftward position of travel, finger 41 thereof becomes engaged with the second one of ratchet teeth 23 in preparation for the next cycle of operation. Subsequent series of rings will cause register wheel 14 to be indexed one unit per series, thus bringing numerals into registration with transparent window 13 which reflect the number of series of rings which have occurred since the handset 12 was last removed from the cradle.

When handset 12 is removed from the cradle, switchhook plunger 18 is caused to be raised upward by the action of extension spring 19, thus rocking pawl 29 clockwise in the manner illustrated in FIGURE 6. When pawl 29 is rocked clockwise, the under surface of the lower arm of pawl 29 contacts the upper surface of finger 41, thereby causing index slide 39 to be rocked in the clockwise direction. During the above described clockwise rotation of pawl 29 and index slide 39, the ends thereof are caused to become disengaged with ratchet teeth 23, thereby allowing register wheel 14 to be twirled in a clockwise direction by spiral torsion spring 27 until zero-position stop lug 25 abuts against stop plate 26. FIGURE 6 illustrates the arrangement of the various elements of the apparatus as would exist when the handset is removed after the telephone had been ringing in response to an incoming call, as evidenced by the configuration of bimetal actuating element 32 compared with that of bimetal compensating element 33, and also by the rightward positioning of index slide 39. It should be understood, however, that the foregoing described operation of clearing the register will be effected whenever the handset is removed from the cradle and regardless of whether an incoming call is being signalled by the telephone bell.

Register wheel 14 cannot be indexed one full revolution because ratchet teeth 23 do not extend fully therearound. If the number of unanswered incoming telephone calls should exceed the capacity of the register, pawl 29 will not have the necessary ratchet teeth with which to block clockwise rotation of the register wheel; rightward travel of index slide 39 will turn the register wheel to a more counterclockwise position but this position will not be held by pawl 29 and the register wheel will restore to the maximum capacity position when the index slide moves leftward.

The heating effect produced by heater element 44 should be sufficient to bring about the indexing of register wheel 14 after approximately three or four rings of the telephone bell. Bimetal actuating element 32 should preferably be thermally insulated to prevent excessive heat loss through hub element 31, as may be accomplished by making hub element 31 of any suitable material having low thermal conductivity characteristics.

In the foregoing, that portion of the apparatus which serves to preserve the record of incoming telephone calls may be described as the register means; that portion of the apparatus which serves to change the record preserved by the register means, in response to incoming telephone calls, is described as the operating means; that portion of the apparatus which serves to remove all recorded information stored by the register means is described as the clearing means. The operation of changing the register means so as to reflect an increase in the total number of recorded incoming telephone calls is described as "indexing." The register means is considered to have been indexed when an incoming telephone call is recorded by the register means.

I claim:

1. The combination including a telephone set having a switchhook operable as a function of normal use of the telephone, register means for recording the incidence of incoming telephone calls, and clearing means for removing recorded information stored in said register means, said clearing means being controllable by movement of said switchhook.

2. The combination including a telephone set having a switchhook operable as a function of normal use of the telephone, a signal ringer circuit, register means for recording the incidence of incoming telephone calls, operating means for indexing said register means, said operating means responsive to the flow of electric current in said ringer circuit, and clearing means for removing recorded information stored in said register means, said clearing means being controllable by movement of said switchhook.

3. The combination defined in claim 2 wherein said operating means includes a bimetal actuating element and an electric heater element in heat-exchange relationship therewith.

4. The combination defined in claim 2 wherein said operating means includes a bimetal actuating element, a bimetal compensating element cooperating with said bimetal actuating element to neutralize the effects of changes in ambient temperature, and an electric heater element in heat-exchange relationship with said bimetal actuating element.

5. Incoming telephone call registering apparatus comprising, in combination, register means for recording the incidence of incoming telephone calls, ambient temperature compensated bimetal operating means disposed for indexing said register means, said operating means including electric heater means in heat-exchange relationship with said bimetal operating means, said heater means being operable to control the movement of said bimetal operating means in response to an incoming telephone call.

References Cited by the Examiner

UNITED STATES PATENTS 454,503 6/1891 Sundeen et al. -------- 179—11

WILLIAM C. COOPER, *Primary Examiner.*

H. ZELLER, *Assistant Examiner.*